(12) United States Patent
Tanaka

(10) Patent No.: US 10,808,115 B2
(45) Date of Patent: Oct. 20, 2020

(54) RESIN COMPOSITION AND MOLDED ARTICLE

(71) Applicant: FUJI XEROX CO., LTD., Tokyo (JP)

(72) Inventor: Ryo Tanaka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 84 days.

(21) Appl. No.: 15/942,448

(22) Filed: Mar. 31, 2018

(65) Prior Publication Data

US 2019/0169417 A1   Jun. 6, 2019

(30) Foreign Application Priority Data

Jul. 20, 2017 (JP) ................. 2017-141215

(51) Int. Cl.
| | | |
|---|---|---|
| C08L 33/12 | (2006.01) | |
| C08L 1/14 | (2006.01) | |
| C08L 25/14 | (2006.01) | |
| C08L 1/12 | (2006.01) | |

(52) U.S. Cl.
CPC .............. C08L 33/12 (2013.01); C08L 1/12 (2013.01); C08L 1/14 (2013.01); C08L 25/14 (2013.01)

(58) Field of Classification Search
CPC .... C08L 33/12; C08L 1/12; C08L 1/14; C08L 25/14; C08F 220/14; C08F 212/08; C08F 222/06; C08F 2220/325; C08F 220/325
USPC ......................................................... 524/40
See application file for complete search history.

(56) References Cited

U.S. PATENT DOCUMENTS

| | | | |
|---|---|---|---|
| 9,605,086 B2 | 3/2017 | Yao | |
| 2010/0292368 A1* | 11/2010 | Takebe | C08J 5/18 524/37 |
| 2011/0058129 A1* | 3/2011 | Kubo et al. | G02F 1/1335 |
| 2011/0130535 A1* | 6/2011 | Yonemura et al. | C08F 222/08 |
| 2014/0253847 A1* | 9/2014 | Saneto | G02F 1/133528 349/96 |
| 2016/0033687 A1* | 2/2016 | Wakizaka et al. | G02B 1/14 |

FOREIGN PATENT DOCUMENTS

| | | |
|---|---|---|
| JP | 2003306577 | 10/2003 |
| JP | 2016183321 | 10/2016 |
| JP | 2016188314 | 11/2016 |

OTHER PUBLICATIONS

Albrecht et al., "Polymethacrylates—Section 5.1.2. Heat Resistant Molding Compounds," Ullmann's Enc. of Ind. Chem., Wiley-VCH Verlag GmbH, pp. 9-10. (Year: 2013).*

* cited by examiner

*Primary Examiner* — Josephine L Chang
(74) *Attorney, Agent, or Firm* — JCIPRNET

(57) ABSTRACT

A resin composition includes a cellulose ester compound and a resin which includes a constituent unit derived from a (meth)acrylic acid ester compound and at least one constituent unit selected from the group consisting of a constituent unit having an epoxy group, a constituent unit having an oxetanyl group, a constituent unit derived from a maleic anhydride compound, and a constituent unit derived from an itaconic anhydride compound. The constituent unit derived from a (meth)acrylic acid ester compound is included in an amount of 40 mass % or greater with respect to a total mass of the resin.

7 Claims, No Drawings

RESIN COMPOSITION AND MOLDED ARTICLE

CROSS-REFERENCE TO RELATED APPLICATIONS

This application is based on and claims priority under 35 USC 119 from Japanese Patent Application No. 2017-141215 filed Jul. 20, 2017.

BACKGROUND

(i) Technical Field

The present invention relates to a resin composition and a molded article.

(ii) Related Art

Various thermoplastic resins have been provided and used for many purposes. For example, thermoplastic resins are used for various components of home appliances or vehicles, or housings of office equipment or electronic or electric equipment.

In recent years, plant-derived resins have been used as thermoplastic resins, and a cellulose ester compound is a plant-derived resin which has been known.

The cellulose ester compound may be used alone or used as a resin composition by being mixed with a resin other than the cellulose ester compound.

SUMMARY

According to an aspect of the invention, there is provided a resin composition including a cellulose ester compound and a resin which includes a constituent unit derived from a (meth)acrylic acid ester compound and at least one constituent unit selected from the group consisting of a constituent unit having an epoxy group, a constituent unit having an oxetanyl group, a constituent unit derived from a maleic anhydride compound, and a constituent unit derived from an itaconic anhydride compound, in which the constituent unit derived from a (meth)acrylic acid ester compound is included in an amount of 40 mass % or greater with respect to a total mass of the resin.

DETAILED DESCRIPTION

Hereinafter, exemplary embodiments of the invention will be described in detail.

Resin Composition

A resin composition according to this exemplary embodiment contains a cellulose ester compound and a resin (hereinafter, also may be referred to as "specific resin") in which a constituent unit derived from a (meth)acrylic acid ester compound is included in an amount of 40 mass % or greater with respect to the total mass of the resin, and at least one constituent unit selected from the group consisting of a constituent unit having an epoxy group, a constituent unit having an oxetanyl group, a constituent unit derived from a maleic acid compound, and a constituent unit derived from an itaconic acid compound is included.

According to the resin composition according to this exemplary embodiment, the tensile break strain of a molded article to be obtained is higher than in a case where a resin composition including a cellulose ester compound and a resin in which a constituent unit derived from a (meth)acrylic acid ester compound is contained in an amount of less than 40 mass % with respect to the total mass of the resin is used. The reason for this is not clear, but presumed as follows.

Since a constituent unit derived from an acrylic acid ester compound has high polarity, a resin including the constituent unit is thought to be likely to mix with a cellulose ester compound which is a resin having high polarity likewise. Therefore, in a case where a specific resin containing a constituent unit derived from a (meth)acrylic acid ester compound in an amount of 40 mass % or greater with respect to the total mass of the resin is used, it is presumed that the cellulose ester compound and the resin are mixed in a substantially uniform state, and the tensile break strain of a molded article to be obtained increases.

In addition, the specific resin used in this exemplary embodiment has at least one constituent unit selected from the group consisting of a constituent unit having an epoxy group, a constituent unit having an oxetanyl group, a constituent unit derived from a maleic anhydride compound, and a constituent unit derived from an itaconic anhydride compound. It is thought that since the structure included in these constituent units (for example, epoxy group or carboxylic anhydride structure) forms a crosslinking structure with the cellulose ester compound, the strength of an interface between the cellulose ester compound and the resin increases, and thus the tensile break strain of a molded article to be obtained increases.

In addition, the resin contains 40 mass % or greater of a constituent unit derived from an acrylic acid ester compound, and the resin has higher stiffness than the cellulose ester compound. Accordingly, it is thought that in a case of a resin composition obtained by mixing the resin and the cellulose ester compound, the tensile elastic modulus of a molded article to be obtained is more likely to increase than in a case of a resin composition obtained using a cellulose ester compound alone.

Furthermore, it is thought that since the resin has a crosslinking structure with the cellulose ester compound as described above, the tensile elastic modulus and the Charpy impact strength are likely to increase.

Moreover, in a case where a resin composition obtained by mixing two or more kinds of resins is used, light interference may occur at an interface between the resins mixed therewith, and thus pearly luster may be generated in a molded article to be obtained. In the resin composition according to this exemplary embodiment, the cellulose ester compound and the resin are mixed in a substantially uniform state as described above, and thus it is thought that the light interference hardly occurs, and the generation of pearly luster is likely to be suppressed in a molded article to be obtained.

The components included in the resin composition according to this exemplary embodiment will be described in detail.

In this specification, regarding the amount of a component in a composition, in a case where the component in the composition corresponds to plural substances, the amount of the component means a total amount of the plural substances existing in the composition unless otherwise noted.

In this specification, the "(meth)acrylic acid" means "an acrylic acid or a methacrylic acid".

Cellulose Ester Compound

The resin composition according to this exemplary embodiment contains a cellulose ester compound.

The cellulose ester compound is a cellulose derivative in which apart of hydroxyl groups is substituted with acetyl groups. Specifically, the cellulose ester compound is, for example, preferably a cellulose derivative represented by Formula (1).

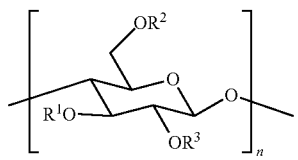

Formula (1)

In Formula (1), $R^1$, $R^2$, and $R^3$ each independently represent a hydrogen atom or an acyl group. n represents an integer of 2 or more. At least a part of n $R^1$, n $R^2$, and n $R^3$ represents an acyl group.

In Formula (1), the range of n is not particularly limited. n may be determined in accordance with a target weight average molecular weight range. For example, n is 120 or greater and 800 or less.

The compound represented by Formula (1) includes, for example, preferably at least one selected from the group consisting of an acetyl group, a propionyl group, and a butyryl group, more preferably at least one selected from the group consisting of a propionyl group and a butyryl group, and even more preferably an acetyl group and at least one selected from the group consisting of a propionyl group and a butyryl group as the acyl group included in $R^2$, $R^2$, or $R^3$.

That is, for example, it is preferable that the cellulose ester compound used in this exemplary embodiment includes at least one selected from the group consisting of cellulose acetate propionate and cellulose acetate butyrate.

Weight Average Molecular Weight

The weight average molecular weight of the cellulose ester compound used in this exemplary embodiment is, for example, preferably 30,000 or greater and 300,000 or less, and more preferably 70,000 or greater and 250,000 or less in view of suppressing a reduction in heat resistance of a molded article and improving fluidity.

In this specification, the weight average molecular weight (Mw) is a value measured in terms of polystyrene using tetrahydrofuran with a gel permeation chromatography apparatus (GPC apparatus: manufactured by TOSOH CORPORATION, HLC-8320GPC, Column: TSKgel α-M).

Substitution Degree

The substitution degree of the cellulose ester compound used in this exemplary embodiment is, for example, preferably 2.1 or greater and 2.9 or less, and more preferably 2.2 or greater and 2.8 or less.

Here, the substitution degree is an index indicating the degree of substitution of the hydroxyl group of the cellulose with an acyl group. That is, the substitution degree is an index indicating the acylation degree of the cellulose ester compound. Specifically, the substitution degree means an average number of substitutions in the molecule, in which three hydroxyl groups on the D-glucopyranose unit of the cellulose ester compound are substituted with acyl groups.

The substitution degree is measured from the integration ratio of the peak derived from the acyl group and the hydrogen derived from the cellulose with the use of $H^1$-NMR (JMN-ECA/manufactured by JEOL RESONANCE Inc.). For example, in a case where the degree of substitution with acetyl group is 2.4, the constituent unit molecular weight of the cellulose ester compound having an acetyl group as a substituent is 263, and in a case where the degree of substitution with acetyl group is 2.9, the constituent unit molecular weight is 284.

In this specification, in a case where the cellulose ester compound is substituted with plural kinds of acyl groups such as an acetyl group, a propionyl group, and a butyryl group, an average number of substitutions in the molecule, in which three hydroxyl groups on the D-glucopyranose unit of the cellulose ester compound are substituted with acetyl groups also may be referred to as a degree of substitution with acetyl group, an average number of substitutions with propionyl group in the molecule also may be referred to as a degree of substitution with propionyl group, and an average number of substitutions with butyryl group in the molecule also may be referred to as a degree of substitution with butyryl group.

In the cellulose ester compound used in this exemplary embodiment, for example, it is preferable that the degree of substitution with acetyl group is 0.05 or greater and 2.85 or less and the degree of substitution with propionyl group is 0.05 or greater and 2.85 or less, or it is preferable that the degree of substitution with acetyl group is 0.05 or greater and 2.85 or less and the degree of substitution with butyryl group is 0.05 or greater and 2.85 or less.

Polymerization Degree

The polymerization degree of the cellulose ester compound may be, for example, 120 or greater and 800 or less, 200 or greater and 750 or less, or 250 or greater and 750 or less. In a case where the polymerization degree of the cellulose ester compound is within the above range, a resin composition in which a reduction in heat resistance of a molded article is suppressed and fluidity is improved is likely to be obtained.

The polymerization degree of the cellulose ester compound is obtained from a weight average molecular weight in accordance with the following procedures.

First, the weight average molecular weight of the cellulose ester compound is measured by the above-described method.

Next, the weight average molecular weight is divided by the skeleton molecular weight of the cellulose ester compound to obtain the polymerization degree of the cellulose ester compound.

The skeleton molecular weight of the cellulose ester compound is calculated from the above-described substitution degree.

Producing Method

The method of producing the cellulose ester compound is not particularly limited. For example, the cellulose ester compound may be produced by performing acylation, molecular weight reduction (depolymerization), and if necessary, deacylation on cellulose. A commercially available cellulose ester compound may be used after being subjected to molecular weight reduction (depolymerization) so as to obtain a predetermined weight average molecular weight.

Content

Preferably, the resin composition according to this exemplary embodiment contains the cellulose ester compound in an amount of, for example, 60 mass % or greater and 95 mass % or less, and more preferably in an amount of 70 mass % or greater and 85 mass % or less with respect to the total mass of the resin composition from the viewpoint of increasing the tensile break strain of a molded article to be obtained.

The resin composition according to this exemplary embodiment may contain one or more kinds of cellulose ester compounds.

Specific Resin

The resin composition according to this exemplary embodiment includes a resin (specific resin) in which a constituent unit derived from a (meth)acrylic acid ester compound is included in an amount of 40 mass % or greater with respect to the total mass of the resin, and at least one constituent unit (hereinafter, also may be referred to as "constituent unit having crosslinkable group") selected from the group consisting of a constituent unit having an epoxy group, a constituent unit having an oxetanyl group, a constituent unit derived from a maleic anhydride compound, and a constituent unit derived from an itaconic anhydride compound is included.

The specific resin according to this exemplary embodiment may be a linear polymer or a polymer having another shape such as a network polymer or a star polymer, and is, for example, preferably a linear polymer.

Constituent Unit Derived from (Meth)acrylic Acid Ester Compound

The specific resin according to this exemplary embodiment contains a constituent unit derived from a (meth)acrylic acid ester compound.

The specific resin contains the constituent unit derived from a (meth)acrylic acid ester compound in a case where, for example, a (meth)acrylic acid ester compound is used as a monomer in the production of the specific resin.

In this exemplary embodiment, a constituent unit included in a constituent unit having a crosslinkable group to be described later is not included in the constituent unit derived from a (meth)acrylic acid ester compound.

As the (meth)acrylic acid ester compound, although not particularly limited, a monofunctional (meth)acrylic acid ester compound having only one (meth)acryloxy group is preferable from the viewpoint that the specific resin is, for example, preferably the above-described linear polymer.

The (meth)acrylic acid ester compound is not particularly limited, but from the viewpoint of increasing the tensile break strain of a molded article to be obtained, the (meth)acrylic acid ester compound is, for example, preferably an alkyl (meth)acrylate compound, and more preferably an alkyl (meth)acrylate compound having 1 to 8 carbon atoms in an alkyl group.

Examples of the (meth)acrylic acid ester compound used in this exemplary embodiment include methyl (meth)acrylate, ethyl (meth)acrylate, propyl (meth)acrylate, isopropyl (meth)acrylate, n-butyl (meth)acrylate, isobutyl (meth)acrylate, t-butyl (meth)acrylate, hexyl (meth)acrylate, octyl (meth)acrylate, and 2-ethylhexyl (meth)acrylate. For example, methyl acrylate, methyl methacrylate, butyl methacrylate, or 2-ethylhexyl methacrylate is preferable, and methyl methacrylate is more preferable.

Content

The specific resin used in this exemplary embodiment contains the constituent unit derived from a (meth)acrylic acid ester compound in an amount of 40 mass % or greater with respect to the total mass of the specific resin. Preferably, the above constituent unit is contained in an amount of, for example, 50 mass % or greater, and more preferably in an amount of 60 mass % or greater from the viewpoint of increasing the tensile break strain.

In a case where the content is less than 40 mass %, the tensile break strain of a molded article to be obtained is reduced. The reason for this is thought to be that the cellulose ester compound is unlikely to mix with the specific resin.

In a case where the content is 40 mass % or greater (for example, preferably 50 mass % or greater, and more preferably 60 mass % or greater), the tensile elastic modulus and the Charpy impact strength of a molded article to be obtained and are likely to increase, and the above-described pearly luster is likely to be suppressed in a molded article to be obtained.

The specific resin used in this exemplary embodiment may include one or more kinds of constituent units derived from a (meth)acrylic acid ester compound.

The content of the constituent unit derived from a (meth)acrylic acid ester compound in the specific resin is measured using an integration ratio of NMR.

Constituent Unit Having Crosslinkable Group

The specific resin used in this exemplary embodiment contains at least one constituent unit (constituent unit having crosslinkable group) selected from the group consisting of a constituent unit having an epoxy group, a constituent unit having an oxetanyl group, a constituent unit derived from a maleic anhydride compound, and a constituent unit derived from an itaconic anhydride compound. From the viewpoint of increasing the tensile break strain, the specific resin used in this exemplary embodiment contains, for example, preferably a constituent unit having an epoxy group or a constituent unit derived from a maleic anhydride compound.

Hereinafter, the respective constituent units will be described in detail.

Constituent Unit Having Epoxy Group

The specific resin contains a constituent unit having an epoxy group in a case where, for example, a monomer having an epoxy group is used as a monomer in the production of the specific resin.

The constituent unit having an epoxy group is not particularly limited. Examples thereof include a constituent unit derived from a (meth)acrylic acid ester compound having an epoxy group from the viewpoint of easy production of a copolymer between the constituent unit and the above-described (meth)acrylic acid ester compound.

Examples of the monomer having an epoxy group include glycidyl (meth)acrylate, vinyl glycidyl ether, [(3,4-epoxycyclohexane)-1-yl]methyl methacrylate, and 4-vinyl glycidyl benzoate, and for example, glycidyl methacrylate is preferable.

Constituent Unit Having Oxetanyl Group

The specific resin contains a constituent unit having an oxetanyl group in a case where, for example, a monomer having an oxetanyl group is used as a monomer in the production of the specific resin.

The constituent unit having an oxetanyl group is not particularly limited. Examples thereof include a constituent unit derived from a (meth)acrylic acid ester compound having an oxetanyl group from the viewpoint of easy production of a copolymer between the constituent unit and the above-described (meth)acrylic acid ester compound.

Examples of the monomer having an oxetanyl group include oxetane-3-yl (meth)acrylate and (3-ethyloxetane-3-yl)methyl (meth)acrylate.

Constituent Unit Derived from Maleic Anhydride Compound

The specific resin contains a constituent unit derived from a maleic anhydride compound in a case where, for example, a maleic anhydride compound is used as a monomer in the production of the specific resin.

Examples of the constituent unit derived from a maleic anhydride compound include a constituent unit represented by Formula A.

Formula A

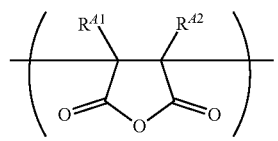

In Formula A, $R^{A1}$ and $R^{A2}$ each independently represent a hydrogen atom or a monovalent hydrocarbon group, and all of $R^{A1}$ and $R^{A2}$ preferably represent, although not particularly limited, a hydrogen atom.

Examples of the monovalent hydrocarbon group include an alkyl group and an aryl group. For example, an alkyl group having 1 to 8 carbon atoms or an aryl group having 6 to 12 carbon atoms is preferable, and an alkyl group having 1 to 4 carbon atoms is more preferable.

Constituent Unit Derived From Itaconic Anhydride Compound

The specific resin contains a constituent unit derived from an itaconic anhydride compound in a case where, for example, an itaconic anhydride compound is used as a monomer in the production of the specific resin. Examples of the constituent unit derived from an itaconic anhydride compound include a constituent unit represented by Formula B.

Formula B

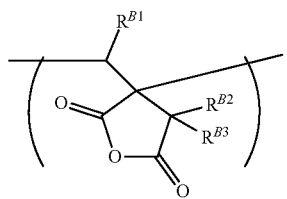

In Formula B, $R^{B1}$, $R^{B2}$, and $R^{B3}$ each independently represent a hydrogen atom or a monovalent hydrocarbon group, and all of $R^{B1}$, $R^{B2}$, and $R^{B3}$ preferably represent, although not particularly limited, a hydrogen atom.

Examples of the monovalent hydrocarbon group include an alkyl group and an aryl group. For example, an alkyl group having 1 to 8 carbon atoms or an aryl group having 6 to 12 carbon atoms is preferable, and an alkyl group having 1 to 4 carbon atoms is more preferable.

Preferably, the specific resin used in this exemplary embodiment contains a constituent unit having a crosslinkable group in an amount of, for example, 0.5 mass % or greater and 30 mass % or less, more preferably in an amount of 3 mass % or greater and 25 mass % or less, and even more preferably in an amount of 5 mass % or greater and 20 mass % or less with respect to the total mass of the specific resin from the viewpoint of increasing the tensile break strain.

The specific resin used in this exemplary embodiment may include one or more kinds of constituent units having a crosslinkable group.

Regarding the content, the styrene equivalent is measured at an absorbance of 269 nm after dissolution in a solvent. The epoxy equivalent and the oxetane equivalent are measured according to JIS K 7236. The maleic anhydride equivalent and the itaconic anhydride equivalent are measured according to JIS K 1557-5.

Other Constituent Units

The specific resin used in this exemplary embodiment may contain a constituent unit other than the constituent unit derived from a (meth)acrylic acid ester compound and the constituent unit having a crosslinkable group.

In a case where other constituent units are contained, the properties of the specific resin change and the properties of a molded article to be obtained change.

Examples of other constituent units include a constituent unit derived from a styrene compound.

Examples of the styrene compound include styrene, 4-bromostyrene, perfluorostyrene, α-methylstyrene, and vinyltoluene, and although not particularly limited, styrene is preferable.

In a case where the specific resin used in this exemplary embodiment contains a styrene compound, the specific resin obtains a high strength. Therefore, a resin composition is obtained which is excellent in tensile elastic modulus of a molded article to be obtained.

Preferably, the specific resin used in this exemplary embodiment contains other constituent units in an amount of, for example, 0.5 mass % or greater and 30 mass % or less, more preferably in an amount of 3 mass % or greater and 25 mass % or less, and even more preferably in an amount of 5 mass % or greater and 20 mass % or less with respect to the total mass of the specific resin.

Weight Average Molecular Weight

The weight average molecular weight of the specific resin used in this exemplary embodiment is, for example, preferably 30,000 or greater and 500,000 or less, and more preferably 50,000 or greater and 500,000 or less.

Preferable Aspects

The specific resin used in this exemplary embodiment includes, as a constituent unit derived from a (meth)acrylic acid ester compound, for example, preferably a constituent unit derived from an alkyl (meth)acrylate compound, and more preferably a constituent unit derived from methyl methacrylate from the viewpoint of increasing the tensile break strain and the tensile elastic modulus.

Preferably, the resin composition used in this exemplary embodiment includes, as the specific resin, for example, a copolymer of a styrene compound, an alkyl (meth)acrylate compound, and a maleic anhydride compound. Preferable aspects of the respective compounds are as described above.

Although not particularly limited, a styrene-methyl methacrylate-maleic anhydride copolymer is preferable as the specific resin used in this exemplary embodiment from the viewpoint of increasing the tensile break strain and the tensile elastic modulus.

Content

In the resin composition according to this exemplary embodiment, the ratio of the total mass of the specific resin with respect to the total mass of the cellulose ester compound (total mass of specific resin/total mass of cellulose ester compound) is, for example, preferably 0.05 or greater and 0.6 or less, and more preferably 0.1 or greater and 0.5 or less from the viewpoint of increasing the tensile break strain.

Plasticizer

The resin composition according to this exemplary embodiment may further include a plasticizer.

Examples of the plasticizer include an adipic acid ester-containing compound, a polyether ester compound, a condensed phosphoric acid ester compound, a sebacic acid ester compound, a glycol ester compound, an acetic acid ester compound, a dibasic acid ester compound, a phosphoric acid ester compound, a phthalic acid ester compound, camphor, a citric acid ester compound, a stearic acid ester compound, metallic soap, a polyol compound, and a polyalkylene oxide compound.

Among these, for example, an adipic acid ester-containing compound and a polyether ester compound are preferable, and an adipic acid ester-containing compound is more preferable.

As the plasticizer, for example, a plasticizer described in JP2016-183321A is preferably used.

In a case where a plasticizer is included in the resin composition according to this exemplary embodiment, the content thereof with respect to the total amount of the resin composition is not particularly limited. The content may be 15 mass % or less (for example, preferably 10 mass % or less, and more preferably 5 mass % or less) with respect to the total amount of the resin composition in view of the fact that a reduction in heat resistance of a molded article is suppressed and a resin composition having improved fluidity is likely to be obtained even in a case where the plasticizer is contained. In a case where the content of the plasticizer is within the above range, bleeding of the plasticizer is likely to be suppressed.

Other Components

The resin composition according to this exemplary embodiment may further include a component other than the above-described components if necessary. Examples of the component include a flame retardant, a compatibilizer, an antioxidant, a release agent, a light-resistant agent, a weather-resistant agent, a colorant, a pigment, a modifier, a drip preventing agent, an antistatic agent, a hydrolysis inhibitor, a filler, and a reinforcing agent (glass fiber, carbon fiber, talc, clay, mica, glass flakes, milled glass, glass beads, crystalline silica, alumina, silicon nitride, aluminum nitride, boron nitride, and the like).

If necessary, a component (additive) such as an acid acceptor for preventing acetic acid release or a reactive trapping agent may be added. Examples of the acid acceptor include oxides such as magnesium oxide and aluminum oxide; metallic hydroxides such as magnesium hydroxide, calcium hydroxide, aluminum hydroxide, and hydrotalcite; calcium carbonate; and talc.

Examples of the reactive trapping agent include epoxy compounds, acid anhydride compounds, and carbodiimides.

The content of each of these components is, for example, preferably 0 mass % or greater and 5 mass % or less with respect to the total amount of the resin composition. Here, "0 mass %" means that the resin composition does not contain other components.

The resin composition according to this exemplary embodiment may contain a resin other than the above-described resins (cellulose ester compound and specific resin). In a case where other resins are contained, the content of other resins with respect to the total amount of the resin composition may be, for example, 5 mass % or less, and is preferably less than 1 mass %. Although not particularly limited, it is more preferable that other resins are not contained (that is, 0 mass %).

Examples of other resins include thermoplastic resins which have been known, and specific examples thereof include polycarbonate resins; polypropylene resins; polyester resins; polyolefin resins; polyester carbonate resins; polyphenylene ether resins, polyphenylene sulfide resins; polysulfone resins; polyether sulfone resins; polyarylene resins; polyether imide resins; polyacetal resins; polyvinyl acetal resins; polyketone resins; polyether ketone resins; polyether ether ketone resins; polyaryl ketone resins; polyether nitrile resins; liquid crystal resins; polybenzimidazole resins; polyparabanic acid resins; vinyl polymers or copolymers obtained by polymerizing or copolymerizing one or more kinds of vinyl monomers selected from the group consisting of aromatic alkenyl compounds, methacrylic acid esters, acrylic acid esters, and vinyl cyanide compounds; diene-aromatic alkenyl compound copolymers; vinyl cyanide-diene-aromatic alkenyl compound copolymers; aromatic alkenyl compound-diene-vinyl cyanide-N-phenyl maleimide copolymers; vinyl cyanide-(ethylene-diene-propylene (EPDM))-aromatic alkenyl compound copolymers; vinyl chloride resins; and chlorinated vinyl chloride resins. A core-shell-type butadiene-methyl methacrylate copolymer is also included. These resins may be used alone or in combination of two or more kinds thereof.

Method of Producing Resin Composition

The method of producing the resin composition according to this exemplary embodiment is not particularly limited. The resin composition may be produced by melt-kneading a mixture including a cellulose ester compound, a specific resin, and if necessary, a plasticizer and other components. The resin composition according to this exemplary embodiment may also be produced by dissolving the above-described components in a solvent.

Examples of the unit for melt-kneading include known units. Specific examples thereof include a twin-screw extruder, a HENSCHEL MIXER, a BANBURY MIXER, a single-screw extruder, a multi-screw extruder, and a co-kneader.

Molded Article

A molded article according to this exemplary embodiment is provided by molding the resin composition according to this exemplary embodiment. That is, the molded article is obtained by molding a resin composition containing a cellulose ester compound and a resin in which a constituent unit derived from a (meth)acrylic acid ester compound is included in an amount of 40 mass % or greater with respect to the total mass of the resin, and at least one constituent unit selected from the group consisting of a constituent unit having an epoxy group, a constituent unit having an oxetanyl group, a constituent unit derived from a maleic anhydride compound, and a constituent unit derived from an itaconic anhydride compound is included.

As the method of molding a molded article according to this exemplary embodiment, although not particularly limited, injection molding is preferable in view of high shape flexibility. Regarding this, the molded article is, although not particularly limited, preferably an injection molded article obtained by injection molding.

The cylinder temperature in the injection molding is, for example, 170° C. or higher and 270° C. or lower, and preferably 190° C. or higher and 250° C. or lower. The mold temperature in the injection molding is, for example, 40° C. or higher and 90° C. or lower, and preferably 60° C. or higher and 80° C. or lower.

The injection molding may be performed using commercially available equipment, such as NEX500 manufactured by NISSEI PLASTIC INDUSTRIAL CO., LTD., NEX150 manufactured by NISSEI PLASTIC INDUSTRIAL CO., LTD., NEX70000 manufactured by NISSEI PLASTIC INDUSTRIAL CO., LTD., PNX40 manufactured by NISSEI PLASTIC INDUSTRIAL CO., LTD., or SE50D manufactured by SUMITOMO HEAVY INDUSTRIES, LTD.

The molding method for obtaining a molded article according to this exemplary embodiment is not limited to the above-described injection molding, and for example, extrusion, blow molding, hot press molding, calendaring, coating molding, cast molding, dipping molding, vacuum molding, transfer molding, or the like may be applied.

The molded article according to this exemplary embodiment may be used for electronic or electric equipment, office equipment, home appliances, automobile interior materials, toys, containers, or the like. More specifically, the molded article is used for housings of electronic or electric equipment or home appliances; various components of electronic or electric equipment or home appliances; interior parts of automobiles; toy blocks; plastic model kits; storage cases of CD-ROMs, DVDs, or the like; dishes; beverage bottles; food trays; wrapping materials; films; or sheets.

EXAMPLES

Hereinafter, this exemplary embodiment will be described in detail with reference to examples, but is not limited to these examples. In the following description, "parts" and are based on the mass unless otherwise noted.

Preparation of Cellulose Ester Compound

Cellulose acetate propionate (manufactured by EASTMAN CHEMICAL COMPANY, CAP482-20), cellulose acetate butyrate (manufactured by EASTMAN CHEMICAL COMPANY, CAB171-15), cellulose acetate butyrate (manufactured by EASTMAN CHEMICAL COMPANY, CAP381-20), and cellulose acetate (manufactured by DAICEL CORPORATION, L-50), which are commercially available, were prepared as (CE1), (CE2), (CE3), and (CE4), respectively. The substitution degrees of these cellulose ester compounds are arranged in Table 1. In the table, DS (Ac), DS (Pr), and DS (Bt) represent a degree of substitution with acetyl group, a degree of substitution with propionyl group, and a degree of substitution with butyryl group, respectively.

TABLE 1

| Cellulose Ester Compound | DS (Ac) | DS (Pr) | DS (Bt) |
| --- | --- | --- | --- |
| CE1 | 0.18 | 2.49 | — |
| CE2 | 2.07 | — | 0.73 |
| CE3 | 1.05 | — | 1.74 |
| CE4 | 2.45 | — | — |

Preparation of Plasticizer

A commercially available adipic acid ester-containing compound plasticizer (manufactured by DAIHACHI CHEMICAL INDUSTRY CO., LTD., Daifatty 121) was prepared as (PL1).

Preparation of Specific Resin

A styrene-methyl methacrylate-maleic anhydride copolymer resin (manufactured by Asahi Kasei Corporation, DELPET 980N), a styrene-maleic acid copolymer resin (manufactured by NOVA Chemicals Corporation, DYLARK D332), a polymethyl methacrylate resin (manufactured by Asahi Kasei Corporation, DELPET 60N), and a polystyrene resin (manufactured by PS JAPAN CORPORATION, HF-77), which are commercially available, were prepared as (At1), (At17), (At21), and (At22), respectively.

Synthesis of Specific Resin

Methyl methacrylate, butyl acrylate, styrene, maleic anhydride, and glycidyl methacrylate (all are monomers) were mixed such that each monomer was used in an amount shown in Table 2. In the table, St, MMA, BA, MAH, and GMA represent styrene, methyl methacrylate, butyl acrylate, maleic anhydride, and glycidyl methacrylate, respectively. 240 parts of ethylbenzene and 1.2 parts of n-octylmercaptan were mixed thereinto prepare a monomer solution under a nitrogen atmosphere. 0.364 parts of 2,2'-azobis (isobutyronitrile) was dissolved in 12.96 parts of ethylbenzene, and then an initiator solution was prepared under a nitrogen atmosphere. These were put into a glass reaction container (volume: 2 L) and reacted for 90 minutes at 100° C. The obtained polymer solution and methanol were mixed by a homogenizer, and then left. The precipitate was dried for 6 hours or longer at 120° C. by a circulation type dryer, and specific resins (At2) to (At16), (At18) to (At20), and (At23) were obtained.

TABLE 2

| | Amount of Monomer Charged (parts) | | | | |
| --- | --- | --- | --- | --- | --- |
| Specific Resin | MMA | BA | St | MAH | GMA |
| At2 | 617.5 | 0 | 0 | 332.5 | 0 |
| At3 | 712.5 | 0 | 95 | 0 | 142.5 |
| At4 | 807.5 | 0 | 0 | 0 | 142.5 |
| At5 | 513 | 0 | 228 | 209 | 0 |
| At6 | 399 | 0 | 361 | 209 | 0 |
| At7 | 874 | 0 | 0 | 76 | 0 |
| At8 | 560.5 | 0 | 294.5 | 95 | 0 |
| At9 | 427.5 | 0 | 427.5 | 95 | 0 |
| At10 | 902.5 | 0 | 0 | 47.5 | 0 |
| At11 | 589 | 0 | 294.5 | 66.5 | 0 |
| At12 | 456 | 0 | 446.5 | 47.5 | 0 |
| At13 | 655.5 | 0 | 285 | 9.5 | 0 |
| At14 | 617.5 | 0 | 313.5 | 9.5 | 0 |
| At15 | 484.5 | 0 | 456 | 9.5 | 0 |
| At16 | 380 | 0 | 285 | 285 | 0 |
| At18 | 427.5 | 0 | 427.5 | 95 | 0 |
| At19 | 427.5 | 0 | 475 | 47.5 | 0 |
| At20 | 418 | 0 | 522.5 | 9.5 | 0 |
| At23 | 295 | 143 | 227 | 285 | 0 |

The compositions of these specific resins were measured by the above-described method. The results are arranged in Table 3. In the table, St, MMA, BA, MAH, and GMA represent a constituent unit derived from styrene, a constituent unit derived from methyl methacrylate, a constituent unit derived from butyl acrylate, a constituent unit derived from maleic anhydride, and a constituent unit derived from glycidyl methacrylate, respectively.

TABLE 3

| Specific Resin | Composition Ratio Between Constituent Units (mass %) | | | | | Content of Constituent Unit Derived from (Meth)acrylic Acid Ester Compound with respect to Total Mass of Resin (mass %) |
| --- | --- | --- | --- | --- | --- | --- |
| | MMA | BA | St | MAH | GMA | |
| At1 | 66.7 | 0.0 | 18.6 | 14.6 | 0.0 | 66.7 |
| At2 | 86.2 | 0.0 | 0.0 | 13.8 | 0.0 | 86.2 |
| At3 | 67.2 | 0.0 | 21.9 | 0.0 | 10.9 | 67.2 |
| At4 | 85.1 | 0.0 | 0.0 | 0.0 | 14.9 | 85.1 |
| At5 | 57.3 | 0.0 | 35.9 | 6.8 | 0.0 | 57.3 |
| At6 | 41.2 | 0.0 | 51.1 | 7.7 | 0.0 | 41.2 |
| At7 | 96.1 | 0.0 | 0.0 | 3.9 | 0.0 | 96.1 |
| At8 | 54.2 | 0.0 | 42.0 | 3.9 | 0.0 | 54.2 |
| At9 | 42.5 | 0.0 | 54.5 | 2.9 | 0.0 | 42.5 |
| At10 | 99.0 | 0.0 | 0.0 | 1.0 | 0.0 | 99.0 |
| At11 | 55.1 | 0.0 | 43.0 | 1.9 | 0.0 | 55.1 |
| At12 | 42.1 | 0.0 | 57.0 | 1.0 | 0.0 | 42.1 |
| At13 | 60.1 | 0.0 | 39.6 | 0.3 | 0.0 | 60.1 |
| At14 | 54.0 | 0.0 | 45.7 | 0.3 | 0.0 | 54.0 |
| At15 | 43.0 | 0.0 | 56.7 | 0.3 | 0.0 | 43.0 |
| At16 | 34.4 | 0.0 | 50.1 | 15.4 | 0.0 | 34.4 |
| At17 | 0.0 | 0.0 | 81.9 | 18.1 | 0.0 | 0.0 |
| At18 | 34.2 | 0.0 | 63.0 | 2.9 | 0.0 | 34.2 |
| At19 | 33.1 | 0.0 | 65.9 | 1.0 | 0.0 | 33.1 |
| At20 | 35.1 | 0.0 | 64.7 | 0.2 | 0.0 | 35.1 |
| At21 | 100.0 | 0.0 | 0.0 | 0.0 | 0.0 | 100.0 |

TABLE 3-continued

| Specific Resin | Composition Ratio Between Constituent Units (mass %) | | | | | Content of Constituent Unit Derived from (Meth)acrylic Acid Ester Compound with respect to Total Mass of Resin (mass %) |
|---|---|---|---|---|---|---|
| | MMA | BA | St | MAH | GMA | |
| At22 | 0.0 | 0.0 | 100.0 | 0.0 | 0.0 | 0.0 |
| At23 | 30.3 | 16.7 | 24.4 | 28.7 | 0.0 | 47.0 |

Production of Resin Composition

A resin composition (pellets) was obtained using a twin-screw kneader (manufactured by LABTECH ENGINEERING COMPANY LTD, LTE20-44) at a charge composition ratio and a cylinder temperature shown in Table 4 or 5.

Injection Molding

With the obtained pellets, an ISO multi-purpose dumbbell test piece (dimensions of measurement part: 10 mm width/4 mm thickness) was molded under conditions of a cylinder temperature shown in Table 4 or 5 and a mold temperature of 60° C. using an injection molding machine (manufactured by NISSEI PLASTIC INDUSTRIAL CO., LTD., NEX500I).

Evaluation Test

Appearance

A surface of the obtained ISO multi-purpose dumbbell test piece was observed to confirm the presence or absence of pearly luster. A situation in which no pearly luster was recognized was evaluated as "good", a situation in which slight pearly luster was recognized was evaluated as "slight pearly luster", and a situation in which pearly luster was clearly recognized was evaluated as "pearly luster". The evaluation results are described in Table 4 or 5.

Bleedout

A letter was written on the surface of the obtained ISO multi-purpose dumbbell test piece using oil-based ink, and the test piece was left for 1,000 hours under conditions of 65° C./90% RH. A bleedout state of the surface of the test piece was evaluated in accordance with the following standards.

None: The letter of the oil-based ink does not bleed. There is no visual bleedout of the plasticizer.

Occurred: The letter of the oil-based ink bleeds, or bleedout of the plasticizer is clearly observed visually.

Tensile Elastic Modulus (MPa)

The tensile elastic modulus of the obtained ISO multi-purpose dumbbell test piece was measured by a method based on ISO527 with the use of a universal testing device (manufactured by SHIMADZU CORPORATION, AUTOGRAPH AG-X plus). The results are described in Table 4 or 5.

Tensile Break Strain (%)

The tensile break strain of the obtained ISO multi-purpose dumbbell test piece was measured by a method based on ISO527 with the use of a universal testing device (manufactured by SHIMADZU CORPORATION, AUTOGRAPH AG-X plus). The results are described in Table 4 or 5.

Charpy Impact Strength (kJ/m$^2$)

The obtained ISO multi-purpose dumbbell test piece was processed into a notched impact test piece by a method based on ISO179, and subjected to the measurement of a notched impact strength at 23° C. with an impact strength measurement device (manufactured by TOYO SEIKI SEISAKU-SHO, LTD., CHARPY AUTO-IMPACT TESTER CHN3). The results are described in Table 4 or 5.

TABLE 4

| | Cellulose Ester Compound | Plasticizer | Specific Resin | Cylinder Temperature | Appearance | Bleedout | Tensile Elastic Modulus (MPa) | Tensile Break Strain (%) | Charpy Impact Strength (kJ/m$^2$) |
|---|---|---|---|---|---|---|---|---|---|
| Example 1 | CE1 = 100 | — | At1 = 3 | 230 | Good | None | 2060 | 52 | 6.2 |
| Example 2 | CE1 = 100 | — | At1 = 5 | 230 | Good | None | 2320 | 41 | 6.04 |
| Example 3 | CE1 = 100 | — | At1 = 25 | 230 | Good | None | 2420 | 40 | 3.91 |
| Example 4 | CE1 = 100 | — | At1 = 50 | 230 | Good | None | 2380 | 37 | 2.68 |
| Example 5 | CE1 = 100 | — | At1 = 75 | 230 | Slight Pearly Luster | None | 2150 | 25 | 2.51 |
| Example 6 | CE1 = 100 | — | At2 = 3 | 230 | Good | None | 2060 | 53 | 6.15 |
| Example 7 | CE1 = 100 | — | At2 = 5 | 230 | Good | None | 2200 | 50 | 6.08 |
| Example 8 | CE1 = 100 | — | At2 = 25 | 230 | Good | None | 2430 | 49 | 4.81 |
| Example 9 | CE1 = 100 | — | At2 = 50 | 230 | Good | None | 2450 | 45 | 3.99 |
| Example 10 | CE1 = 100 | | At2 = 75 | 230 | Good | None | 2170 | 25 | 3.04 |
| Example 11 | CE1 = 100 | | At3 = 3 | 230 | Good | None | 2040 | 45 | 6.01 |
| Example 12 | CE1 = 100 | | At3 = 5 | 230 | Good | None | 2150 | 44 | 5.95 |
| Example 13 | CE1 = 100 | | At3 = 25 | 230 | Good | None | 2330 | 44 | 4.77 |
| Example 14 | CE1 = 100 | | At3 = 50 | 230 | Good | None | 2330 | 36 | 3.74 |
| Example 15 | CE1 = 100 | | At3 = 75 | 230 | Slight Pearly Luster | None | 2170 | 23 | 2.67 |
| Example 16 | CE1 = 100 | | At4 = 3 | 230 | Good | None | 2010 | 51 | 6.04 |
| Example 17 | CE1 = 100 | | At4 = 5 | 230 | Good | None | 2220 | 51 | 5.96 |
| Example 18 | CE1 = 100 | | At4 = 25 | 230 | Good | None | 2420 | 43 | 4.9 |
| Example 19 | CE1 = 100 | | At4 = 50 | 230 | Good | None | 2390 | 34 | 4.01 |
| Example 20 | CE1 = 100 | — | At4 = 75 | 230 | Good | None | 2160 | 22 | 2.99 |
| Example 21 | CE2 = 100 | — | At1 = 25 | 230 | Good | None | 2780 | 18 | 4.26 |
| Example 22 | CE3 = 100 | — | At1 = 25 | 230 | Good | None | 2490 | 51 | 4.77 |
| Example 23 | CE1 = 100 | — | At5 = 25 | 230 | Good | None | 2420 | 42 | 4.11 |
| Example 24 | CE1 = 100 | — | At6 = 25 | 230 | Good | None | 2390 | 37 | 4.25 |
| Example 25 | CE1 = 100 | — | At7 = 25 | 230 | Good | None | 2380 | 35 | 4.17 |
| Example 26 | CE1 = 100 | — | At8 = 25 | 230 | Good | None | 2430 | 35 | 4.05 |
| Example 27 | CE1 = 100 | — | At9 = 25 | 230 | Good | None | 2460 | 33 | 4.02 |
| Example 28 | CE1 = 100 | — | At10 = 25 | 230 | Good | None | 2430 | 25 | 4.13 |
| Example 29 | CE1 = 100 | — | At11 = 25 | 230 | Good | None | 2410 | 23 | 3.71 |
| Example 30 | CE1 = 100 | — | At12 = 25 | 230 | Good | None | 2400 | 27 | 3.87 |

TABLE 4-continued

|  | Cellulose Ester Compound | Plasticizer | Specific Resin | Cylinder Temperature | Appearance | Bleedout | Tensile Elastic Modulus (MPa) | Tensile Break Strain (%) | Charpy Impact Strength (kJ/m$^2$) |
|---|---|---|---|---|---|---|---|---|---|
| Example 31 | CE1 = 100 | — | At13 = 25 | 230 | Good | None | 2460 | 22 | 3.42 |
| Example 32 | CE1 = 100 | — | At14 = 25 | 230 | Slight Pearly Luster | None | 2510 | 23 | 3.28 |
| Example 33 | CE1 = 100 | — | At15 = 25 | 230 | Slight Pearly Luster | None | 2420 | 22 | 2.99 |
| Example 34 | CE4 = 91 | PL1 = 9 | At1 = 25 | 260 | Good | None | 3120 | 7 | 2.52 |
| Example 35 | CE4 = 83 | PL1 = 17 | At1 = 25 | 230 | Good | Occurred | 2700 | 10 | 4.08 |
| Example 36 | CE1 = 100 | — | At23 = 25 | 230 | Slight Pearly Luster | None | 2250 | 40 | 4.27 |

TABLE 5

|  | Cellulose Ester Compound | Plasticizer | Specific Resin | Cylinder Temperature | Appearance | Bleedout | Tensile Elastic Modulus (MPa) | Tensile Break Strain (%) | Charpy Impact Strength (kJ/m$^2$) |
|---|---|---|---|---|---|---|---|---|---|
| Reference Example 1 | CE1 = 100 | — | — | 230 | — | None | 2020 | 51 | 6.28 |
| Reference Example 2 | CE2 = 100 | — | — | 230 | — | None | 2600 | 20 | 6.71 |
| Reference Example 3 | CE3 = 100 | — | — | 230 | — | None | 2190 | 65 | 8.37 |
| Reference Example 4 | CE4 = 91 | PL1 = 9 | — | 260 | — | None | 3100 | 8 | 3.47 |
| Reference Example 5 | CE4 = 83 | PL1 = 17 | — | 230 | — | Occurred | 2600 | 13 | 7.21 |
| Comparative Example 1 | — | — | At1 = 100 | 230 | — | None | 3630 | 4 | 1.21 |
| Comparative Example 2 | — | — | At2 = 100 | 230 | — | None | 3490 | 4 | 1.47 |
| Comparative Example 3 | — | — | At3 = 100 | 230 | — | None | 3410 | 4 | 1.3 |
| Comparative Example 4 | — | — | At4 = 100 | 230 | — | None | 3310 | 3 | 1.84 |
| Comparative Example 5 | — | — | At5 = 100 | 230 | — | None | 3320 | 3 | 1.48 |
| Comparative Example 6 | — | — | At6 = 100 | 230 | — | None | 3380 | 2 | 1.35 |
| Comparative Example 7 | — | — | At7 = 100 | 230 | — | None | 3290 | 2 | 1.76 |
| Comparative Example 8 | — | — | At8 = 100 | 230 | — | None | 3290 | 3 | 1.58 |
| Comparative Example 9 | — | — | At9 = 100 | 230 | — | None | 3270 | 2 | 1.36 |
| Comparative Example 10 | — | — | At10 = 100 | 230 | — | None | 3370 | 2 | 1.74 |
| Comparative Example 11 | — | — | At11 = 100 | 230 | — | None | 3270 | 2 | 1.31 |
| Comparative Example 12 | — | — | At12 = 100 | 230 | — | None | 3300 | 2 | 1.32 |
| Comparative Example 13 | — | — | At13 = 100 | 230 | — | None | 3330 | 3 | 1.44 |
| Comparative Example 14 | — | — | At14 = 100 | 230 | — | None | 3310 | 3 | 1.72 |
| Comparative Example 15 | — | — | At15 = 100 | 230 | — | None | 3340 | 2 | 1.45 |
| Comparative Example 16 | — | — | At16 = 100 | 230 | — | None | 3450 | 3 | 1.6 |
| Comparative Example 17 | — | — | At17 = 100 | 230 | — | None | 3310 | 2 | 1.32 |
| Comparative Example 18 | — | — | At18 = 100 | 230 | — | None | 3290 | 3 | 1.41 |
| Comparative Example 19 | — | — | At19 = 100 | 230 | — | None | 3280 | 3 | 1.3 |
| Comparative Example 20 | — | — | At20 = 100 | 230 | — | None | 3340 | 2 | 1.42 |
| Comparative Example 21 | — | — | At21 = 100 | 230 | — | None | 3330 | 2 | 1.9 |
| Comparative Example 22 | — | — | At22 = 100 | 230 | — | None | 3240 | 5 | 1.22 |
| Comparative Example 23 | CE1 = 100 | — | At16 = 25 | 230 | Pearly Luster | None | 2430 | 13 | 1.58 |
| Comparative Example 24 | CE1 = 100 | — | At17 = 25 | 230 | Pearly Luster | None | 2450 | 12 | 1.54 |
| Comparative Example 25 | CE1 = 100 | — | At18 = 25 | 230 | Pearly Luster | None | 2460 | 8 | 1.31 |
| Comparative Example 26 | CE1 = 100 | — | At19 = 25 | 230 | Pearly Luster | None | 2410 | 7 | 1.39 |
| Comparative Example 27 | CE1 = 100 | — | At20 = 25 | 230 | Pearly Luster | None | 2420 | 8 | 1.38 |
| Comparative Example 28 | CE1 = 100 | — | At21 = 25 | 230 | Good | None | 2360 | 14 | 1.54 |
| Comparative Example 29 | CE1 = 100 | — | At22 = 25 | 230 | Pearly Luster | None | 2280 | 10 | 1.31 |
| Comparative Example 30 | — | — | At23 = 100 | 230 | — | None | 2950 | 8 | 2.86 |
| Comparative Example 31 | CE4 = 91 | PL1 = 9 | At16 = 25 | 260 | Pearly Luster | None | 3100 | 4 | 1.34 |
| Comparative Example 32 | CE4 = 83 | PL1 = 17 | At16 = 25 | 230 | Pearly Luster | Occurred | 2660 | 6 | 2.74 |

According to the resin compositions of Examples 1 to 36, a molded article which is more excellent in tensile break strain is obtained than in a case where a cellulose ester compound and a resin having a constituent unit derived from a (meth)acrylic acid ester compound in an amount of less than 40 mass % with respect to the total mass of the resin are included.

According to the resin compositions of Examples 1 to 36, a molded article which is more excellent in tensile elastic modulus and Charpy impact strength is obtained than in cases of Comparative Examples 23 to 29.

According to the resin compositions of Examples 1 to 36, a molded article in which pearly luster is suppressed is obtained.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition comprising:
   a cellulose ester compound; and
   a resin which includes a constituent unit derived from methyl methacrylate, a constituent unit derived from a maleic anhydride compound, and a constituent unit derived from a styrene compound,
   wherein the constituent unit derived from methyl methacrylate is included in an amount of 40 mass % or greater with respect to a total mass of the resin,
   the cellulose ester compound is included in an amount of greater than 80 mass % and 95 mass % or less with respect to a total mass of the resin composition.

2. The resin composition according to claim 1, wherein a ratio of the total mass of the resin with respect to a total mass of the cellulose ester compound is 0.05 or greater and 0.25 or less.

3. The resin composition according to claim 1, wherein a ratio of the total mass of the resin with respect to a total mass of the cellulose ester compound is 0.1 or greater and 0.25 or less.

4. The resin composition according to claim 1, wherein the cellulose ester compound includes at least one selected from the group consisting of cellulose acetate propionate and cellulose acetate butyrate.

5. The resin composition according to claim 1, wherein the constituent unit derived from a styrene compound is included in an amount of 0.5 mass % or greater and 30 mass % or less with respect to the total mass of the resin.

6. The resin composition according to claim 1, wherein as the resin, a styrene-methyl methacrylate-maleic anhydride copolymer is included.

7. A molded article comprising:
   the resin composition according to claim 1.

* * * * *